UNITED STATES PATENT OFFICE.

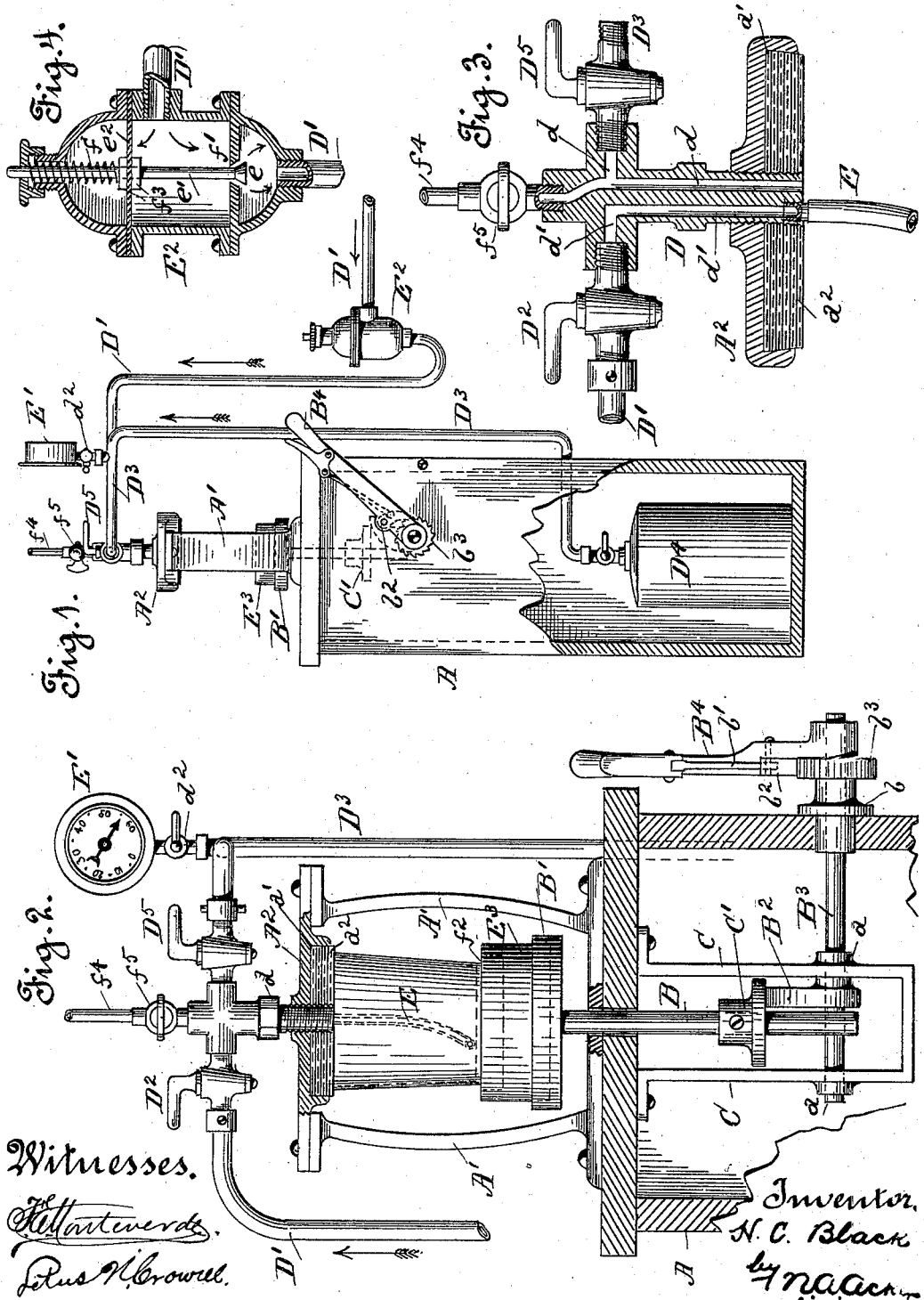

HENRY C. BLACK, OF OAKLAND, CALIFORNIA.

PROCESS OR METHOD OF DRAWING BEER OR SIMILAR LIQUIDS.

SPECIFICATION forming part of Letters Patent No. 607,979, dated July 26, 1898.

Application filed November 3, 1897. Serial No. 657,226. (No model.)

*To all whom it may concern:*

Be it known that I, HENRY C. BLACK, a citizen of the United States, residing at Oakland, in the county of Alameda and State of California, have invented certain new and useful Improvements in Processes or Methods of Drawing Beer or Similar Liquids; and I do hereby declare that the following is a full, clear, and exact description thereof.

This invention relates to a certain new and useful process or method of drawing beer from the cask or keg directly into the glass, the invention being more especially designed for use in connection with saloons or similar places.

In carrying out my improved process or method it is necessary that certain mechanism be employed, which consists in the arrangement of parts and details of construction, as will be hereinafter fully set forth in the drawings and described and pointed out in the specification.

With the ordinary process or method of drawing beer the liquid as drawn from the keg into a glass is exposed to the atmosphere. Consequently the gas escapes therefrom and as the result of thus liberating the gas the beer becomes stale or flat within a short while after being drawn. Hence, of necessity, the drawn beer must be quickly consumed. Again, as the gas is liberated during the flow of the beer into the glass considerable waste is occasioned by reason of foaming and considerable time is required to properly fill the glass. The gas being permitted to escape a good sharp glass of beer cannot be obtained.

The object of the present invention is to provide against the foregoing objections and so arrange that the liquid may be drawn from the keg directly into the glass without allowing the beer to come into contact with the atmosphere, thus preventing the liberation of the gas and enabling the beer to be drawn under full head and with the same sharpness as that contained within the keg. The beer thus drawn not only remains sharp, but inasmuch as the gas is retained therein the glass may be set aside for a considerable length of time without becoming stale or flat. Again, the time consumed in drawing a glass of beer, due to foaming, is obviated.

In order to fully understand the invention, reference must be had to the accompanying sheet of drawings, wherein—

Figure 2 is a broken front view in elevation of the apparatus, showing a glass in position to be filled. Fig. 1 is a side view in elevation, disclosing the air-cylinder and its connection with the filling mechanism. Fig. 3 is a vertical sectional detail view of the two-ways coupling, with the air and beer inlet controlling cocks connected thereto, said view also illustrating the vent-cock and the clamp-head for the glass; and Fig. 4 is a vertical sectional view of the pressure-regulator interposed within the beer-inlet pipe.

The letter A is used to indicate any suitable casing for the apparatus, which may be located in the rear of the counter in a saloon, and A' upwardly-extending brackets or arms which uphold the clamp-head $A^2$. Through the casing works the plunger-rod B, which at its upper end carries the seat B'. This plunger-rod B is raised and lowered by means of the cam $B^2$, mounted upon the cross-shaft $B^3$, which shaft works in bearing $a$ in the supporting-bracket C, depending within the casing A. The cam $B^2$, as thrown over by the movement of the cross-shaft $B^3$, rides upon the under face of the collar C', secured to the plunger B, and raises or lowers said plunger. One end of the cross-shaft $B^3$ extends beyond a bearing-hub $b$, attached to the casing A, Fig. 2, and has mounted thereon the handle $B^4$, which handle carries the catch-rod $b'$, the lower end of which is connected to the fulcrumed pawl $b^2$. This pawl engages with the ratchet-wheel $b^3$, connected to the bearing-hub $b$, in order to hold the handle $B^4$ in any given position.

The under face of the clamp-head $A^2$ is formed with a circular recess $a'$ of such diameter as to receive the upper end of the glass to be filled, and within said recess is fitted an elastic or rubber cushion $a^2$, which when the glass is forced within the recess forms an air-tight connection or joint between the said glass and clamp-head $A^2$. Through the clamp-head extends the coupling D, which is provided with an air-inlet passage-way $d$ and an inlet passage-way $d'$ for the beer or liquid, Fig. 3. The pipe D', which leads from the keg out of which the beer is to be drawn, (not shown,) connects with the passage-way $d'$ by means of the cock $D^2$, while the air-pipe $D^3$, which leads from the tank or reservoir $D^4$, containing air under pressure, connects with the passage-way $d$ by means of the cock $D^5$.

From the lower end of the passage-way $d'$ extends an elastic tube E, which when the glass is in proper position to be filled fits within the glass and conveys the beer flowing through the passage-way $d'$ to the bottom of the glass in order that the same may be discharged at the lowest point. This tube may be said to be constructed as a filling-tube.

To the air-pipe $D^3$ is connected the pressure-gage E', which is controlled by the cock $d^2$, while between the pipe D' and the keg from which the beer is to be drawn is interposed the beer-regulator $E^2$, which at all times controls the pressure of the beer flowing from the keg to the glass. Within the regulator is placed the valve $e$, the stem $e'$ of which extends through the flexible diaphragm $e^2$ and cap of the regulator, being connected to the diaphragm by lock-nuts $f^3$. The valve-stem above the diaphragm is surrounded by the spiral spring $f$, the tension of which holds valve-stem and diaphragm downward, so as to hold the valve $e$ away from its seat $f'$. This regulator operating in any well-known manner calls for no specific description in the present application.

The distance between the clamp-head $A^2$ and the plunger-seat B' is such as to receive the largest-sized glass. Hence in order to use small size glasses a filling-block $E^3$, Fig. 2, should be used, which block fits within the plunger-seat B' and has formed in its upper face a seat $f^2$, within which the glass rests.

When it is desired to draw a glass of beer, the operator places the glass F upon the seat B' or filling-block $E^3$, depending upon the size of the glass, and then turns the handle $B^4$ so as to rotate the cross-shaft $B^3$, in order that the cam $B^2$ may ride beneath the collar C' and raise the plunger B and its seat until the upper end of the glass is forced tightly against the elastic or rubber cushion $a^2$ of the clamp-head, in order to form an air-tight joint. As the pressure in the keg is from forty to forty-five pounds, it becomes necessary that an air-pressure approximately the same be established in the glass itself prior to admission of beer therein. In order to do this, the cock $D^5$ is turned to open the air-pipe $D^3$, when the air will flow from the air tank or reservoir $D^4$ through the pipe $D^3$ and passage-way $d$ of the coupling D into the clamped glass F. A pressure of about forty pounds will then be in the glass, or somewhat less than the pressure in the keg. The cock $D^2$ is then turned to permit the beer to flow from the pipe D', which conveys it from the keg, into the passage-way $d'$ and through the filling-tube E into the glass. As the beer enters the glass under a greater pressure than the air retained therein, the said air will be gradually forced out of the glass as the same is gradually filled with beer and back into the air reservoir or tank $D^4$ through the air-pipe. As the glass becomes filled with beer the operator first turns the cock $D^5$ so as to shut off the flow of air and then opens the air-cock $f^5$ in the vent-pipe $f^4$, which controls the vent passage-way communicating with the air passage-way, so as to permit the surplus air to escape. By this time the glass will have been filled with beer, when the operator then turns the cock $D^2$ to cut off the flow of beer. An opposite throw is then given to the handle $B^4$, so as to impart an opposite rotation to the shaft $B^3$ and cam $B^2$, in order to lower the plunger-rod B and release the filled glass. It will thus be noticed that the glass is filled with beer under pressure, and at no time during the process of drawing is the beer brought into contact with the atmosphere. Consequently the gas has not been liberated therefrom. The beer thus drawn retains the gas of the keg and may therefore remain standing for a considerable length of time without becoming stale or flat.

The regulator $E^2$ is interposed within the pipe D' in order that a uniform air-pressure may be utilized. This is essential for the reason that the pressure in the kegs varies. One keg may have a pressure of sixty-five pounds, while the next keg from which the beer is drawn may have a pressure of only fifty pounds. This difference in the keg-pressure is compensated for by the beer-regulator. Suppose the minimum pressure of the kegs to be fifty pounds. Then the regulator is to be set to withstand such pressure, and under such pressure the beer will flow freely through the same. If the pressure of the keg exceeds that at which the regulator is set, the beer will press upward against the flexible diaphragm and move the same so as to gradually lift the valve-stem and valve in order to reduce the outlet thereof in accordance with the pressure. By forming an air-pressure in the glass slightly less than that of the beer-regulator the beer will flow freely into the glass.

It will thus be understood that the present apparatus is placed out of sight behind the counter in the saloon or any other convenient place.

Having thus described the invention, what I claim as new, and desire to secure protection in by Letters Patent, is—

In a method of drawing beer into glasses consisting in sealing the mouth of the glass, permitting air under pressure to enter the glass, allowing beer under pressure to enter the glass and thereby expel a portion of the compressed air closing off the supply of compressed air just previous to the filling of the glass with the beer and immediately thereafter freely venting the upper portion of the glass to permit the escape of the confined air and finally cutting off the supply of beer.

In testimony whereof I affix my signature, in presence of two witnesses, this 25th day of October, 1897.

HENRY C. BLACK.

Witnesses:
N. A. ACKER,
LEE D. CRAIG.